United States Patent
Sato et al.

(10) Patent No.: US 10,949,657 B2
(45) Date of Patent: Mar. 16, 2021

(54) PERSON'S BEHAVIOR MONITORING DEVICE AND PERSON'S BEHAVIOR MONITORING SYSTEM

(71) Applicant: PANASONIC INTELLECTUAL PROPERTY MANAGEMENT CO., LTD., Osaka (JP)

(72) Inventors: Yuji Sato, Kanagawa (JP); Takeshi Fujimatsu, Kanagawa (JP); Masamoto Tanabiki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 16/462,131

(22) PCT Filed: Sep. 29, 2017

(86) PCT No.: PCT/JP2017/035379
§ 371 (c)(1),
(2) Date: May 17, 2019

(87) PCT Pub. No.: WO2018/096787
PCT Pub. Date: May 31, 2018

(65) Prior Publication Data
US 2019/0332856 A1    Oct. 31, 2019

(30) Foreign Application Priority Data
Nov. 22, 2016    (JP) .............................. JP2016-226690

(51) Int. Cl.
*H04N 7/18*    (2006.01)
*G06K 9/00*    (2006.01)
(Continued)

(52) U.S. Cl.
CPC ..... *G06K 9/00335* (2013.01); *G06K 9/00778* (2013.01); *G06T 7/20* (2013.01);
(Continued)

(58) Field of Classification Search
CPC ........... G06K 9/00335; G06K 9/00778; G06K 9/00664; G06K 9/00785; G06T 7/20; H04N 5/144; H04N 7/181
(Continued)

(56) References Cited

U.S. PATENT DOCUMENTS

2009/0292583 A1* 11/2009 Eilam .................... G06Q 10/06
                                                                         705/7.31
2015/0279116 A1* 10/2015 Yachida ................. H04N 7/185
                                                                          345/633
(Continued)

FOREIGN PATENT DOCUMENTS

| JP | 2008-016897 | 1/2008 |
|---|---|---|
| JP | 2010-272958 | 12/2010 |

(Continued)

OTHER PUBLICATIONS

International Search Report issued in International Patent Application No. PCT/JP2017/035379, dated Dec. 19, 2017.

*Primary Examiner* — Jayanti K Patel
*Assistant Examiner* — Richard B Carter
(74) *Attorney, Agent, or Firm* — Greenblum & Bernstein, P.L.C.

(57) ABSTRACT

A person's behavior monitoring device includes a processor for acquiring a captured image of each of a plurality of cameras, acquiring information relating to a person requiring special attention by analyzing the captured image, and generating a monitoring image including the information, in which the processor determines, for each of the cameras, whether or not a person detected from the captured image is (Continued)

a long-time stayer who stays for a long-time in a capturing area of one of the cameras based on a result of tracking the person, and superimposes and displays a person rectangle that enables identification of a degree of stay on the captured image in correspondence with a person corresponding to the long-time stayer.

12 Claims, 7 Drawing Sheets

(51) Int. Cl.
 *G06T 7/20* (2017.01)
 *H04N 5/14* (2006.01)

(52) U.S. Cl.
 CPC ..... *G06K 9/00664* (2013.01); *G06K 9/00785* (2013.01); *H04N 5/144* (2013.01); *H04N 7/181* (2013.01)

(58) Field of Classification Search
 USPC .................. 345/633; 348/143, 159; 705/7.31
 See application file for complete search history.

(56) References Cited

U.S. PATENT DOCUMENTS

| | | |
|---|---|---|
| 2015/0371403 A1 | 12/2015 | Koyama et al. |
| 2016/0012280 A1 | 1/2016 | Ito et al. |
| 2016/0063712 A1* | 3/2016 | Matsumoto .............. H04N 7/18 348/143 |
| 2017/0303862 A1* | 10/2017 | Nakamura ............ G06T 7/0012 |

FOREIGN PATENT DOCUMENTS

| | | |
|---|---|---|
| WO | 2014/132841 | 9/2014 |
| WO | 2014/155922 | 10/2014 |

* cited by examiner

REAL TIME TRACKING TABLE

| Cam | Id | Begin time | Exist time | Long stay flag |
|---|---|---|---|---|
| A | 111 | 2016:09:01:00:00:01 | · · · | TRUE |
| B | 222 | 2016:09:01:01:01:01 | · · · | FALSE |
| C | 333 | · · · | · · · | TRUE |

FIG. 5B

TRACKING COMPLETION TABLE

| Cam | Id | Begin time | Exist time | Long stay flag |
|---|---|---|---|---|
| A | 1 | 2016:08:01:00:00:01 | · · · | TRUE |
| B | 2 | 2016:08:01:01:01:01 | · · · | TRUE |
| A | 11 | 2016:08:10:01:01:01 | · · · | TRUE |
| A | 44 | · · · | · · · | TRUE |
| B | 55 | · · · | · · · | FALSE |

FIG. 6

WANDERING PERSON TABLE

| Current cam | Current Id | Previous cam | Previous Id | Walkaround Score |
|---|---|---|---|---|
| A | 11 | B | 1 | 0.85 |
| A | 111 | A | 11 | 0.8 |
| B | 222 | A | 2 | 0.89 |

PERSON'S BEHAVIOR MONITORING DEVICE AND PERSON'S BEHAVIOR MONITORING SYSTEM

TECHNICAL FIELD

The present disclosure relates to a person's behavior monitoring device and a person's behavior monitoring system that generate a monitoring image from captured images of a plurality of cameras installed in a facility and display the monitoring image on a display device.

BACKGROUND ART

In the premises of a railway station, when there is a person causing a dangerous behavior, it will interfere with safe and smooth operation of a train, so it is necessary to promptly find a person requiring special attention who is likely to cause such dangerous behavior and take appropriate measures at an early stage.

As a technique for promptly finding such a person requiring special attention, in the related art, there are known techniques for determining a suspicious behavior by recognizing a behavior of a person from a captured image of the camera to find the person requiring special attention (see PTL 1). In addition, there is known a technology of detecting a person from a captured image of the camera and acquiring a number of appearances of each person appearing in the captured image and determining that there is a high possibility of wandering and detecting a wandering person when the number of appearances is large (see PTL 2).

CITATION LIST

Patent Literature

PTL 1 Japanese Patent Unexamined Publication No. 2010-272958
PTL 2 International Publication No. 2014/132841

SUMMARY OF THE INVENTION

However, in these related arts, in a circumstance where a large number of persons come and go, such as in the premises of a station, in some cases, a large number of persons requiring special attention are found, so there are problems that it is impossible to determine which person need to be paid attention to, and it is impossible for a surveillant to efficiently perform the monitoring work of monitoring the person staying in a facility in real time.

In view of the above, the main object of the present disclosure is to provide a person's behavior monitoring device and a person's behavior monitoring system which may efficiently perform a monitoring work to monitor a person staying in the facility in real time by paying attention to the person requiring special attention appropriately by the surveillant even in an environment where many persons come and go.

A person's behavior monitoring device according to the present disclosure is a person's behavior monitoring device that generates a monitoring image from captured images of a plurality of cameras installed in the facility and displays the monitoring image on a display device, and includes a processor for acquiring the captured image of each of the plurality of cameras, acquiring information relating to a person requiring special attention by analyzing the captured image, and generating the monitoring image including the information, in which the processor determines, for each of the cameras, whether or not a person detected from the captured image is a long-time stayer who stays continuously for a predetermined period of time or longer in a capturing area of one of the cameras based on a result of tracking the person, and generates the monitoring image in which a fixed form image that enables identification of a degree of stay is superimposed on the captured image in correspondence with the person corresponding to the long-time stayer.

Further, a person's behavior monitoring system according to the present disclosure includes: a plurality of cameras installed in a facility, a server device that acquires captured images of the plurality of cameras through a network to generate a monitoring image, and a display device that displays the monitoring image output from the server device, in which the server device includes a processor for acquiring a captured image of each of a plurality of cameras, acquiring information relating to a person requiring special attention by analyzing the captured image, and generating the monitoring image including the information, and the processor determines, for each of the cameras, whether or not a person detected from the captured image is a long-time stayer who stays continuously for a predetermined period of time or longer in a capturing area of one of the cameras based on a result of tracking the person, and generates the monitoring image in which a fixed form image that enables identification of the degree of stay is superimposed on the captured image in correspondence with the person corresponding to the long-time stayer.

According to the present disclosure, it is possible for the surveillant to pay attention to the person requiring special attention by recognizing a need for attention with the fixed form image that enables identification of the degree of stay. With this configuration, it is possible to efficiently perform a monitoring work for monitoring a person staying in the facility in real time by appropriately paying attention to a person requiring special attention, by the surveillant even in an environment where many persons come and go.

DESCRIPTION OF EMBODIMENTS

A first invention made to solve the above problem is a person's behavior monitoring device that generates a monitoring image from captured images of a plurality of cameras installed in a facility and displays the monitoring image on a display device, includes a processor for acquiring a captured image of each of a plurality of cameras, acquiring information relating to a person requiring special attention by analyzing the captured image, and generating a monitoring image including the information, and the processor determines, for each of the cameras, whether or not a person detected from the captured image is a long-time stayer who stays continuously for a predetermined period of time or longer in a capturing area of one of the cameras based on a result of tracking the person, and generates a monitoring image in which a fixed form image that enables identification of a degree of stay to be identified is superimposed on the captured image in correspondence with a person corresponding to the long-time stayer.

With this configuration, it is possible for a surveillant to pay attention to the person requiring special attention by recognizing the need for attention with the fixed form image that enables identification of a degree of stay. With this configuration, it is possible to efficiently perform a monitoring work for monitoring a person staying in the facility in real time by appropriately paying attention to the person requiring special attention, by the surveillant even in an environment where many persons come and go.

According to a second aspect of the present invention, the processor is configured to change a display mode of the fixed form image when the same person is determined to be the long-time stayer for a plurality of times.

With this configuration, it is possible to call the attention of the surveillant by changing the display mode of the fixed form image when a person is determined to be the long-time stayer for a plurality of times.

According to a third aspect of the present invention, the processor is configured to change the display mode of the fixed form image when a same person as the person determined to be the long-time stayer, based on a captured image by the first camera, is determined to be the long-time stayer, based on a captured image by the second camera.

With this configuration, it is possible to call the attention of the surveillant by changing the display mode of the fixed form image when a person is determined to be the long-time stayer with captured images of different cameras.

In a fourth aspect of the present invention, the fixed form image is a frame image surrounding at least a part of a person region in the captured image and at least one of display attributes of color, shading, line type, and line thickness in the frame image is changed in accordance with the degree of stay.

With this configuration, it is possible to clearly display the degree of stay of a person on the monitoring image.

In a fifth aspect of the present invention, the fixed form image is configured to include at least one of a figure, a character, and a symbol displayed inside or in the vicinity of a person region in the captured image.

With this configuration, it is possible to clearly display the degree of stay of a person on the monitoring image.

In a sixth aspect of the invention, the processor is configured to cause an alarm device to perform an alarm operation to notify the surveillant that a person requiring special attention is present when the same person is determined to be the long-time stayer for a plurality of times.

With this configuration, it is possible to promptly notify the surveillant that a person requiring special attention is present.

According to a seventh aspect of the present invention, there is provided a person's behavior monitoring system that includes a plurality of cameras installed in the facility, a server device that acquires captured images of the plurality of cameras through a network to generate a monitoring image, and a display device that displays the monitoring image output from the server device, in which the server device includes a processor for acquiring a captured image of each of a plurality of cameras, acquiring information relating to a person requiring special attention by analyzing the captured image, and generating a monitoring image including the information, and the processor determines, for each of the cameras, whether or not a person detected from the captured image is a long-time stayer who stays continuously for a predetermined period of time or longer in a capturing area of one of the cameras based on a result of tracking the person, and generates a monitoring image in which a fixed form image that enables identification of the degree of stay is superimposed on the captured image in correspondence with a person corresponding to the long-time stayer.

With this configuration, like the first invention, it is possible to efficiently perform a monitoring work for monitoring a person staying in the facility in real time by appropriately paying attention to a person requiring special attention, by the surveillant even in an environment where many persons come and go.

Hereinafter, embodiments will be described with reference to the drawings.

Figure 1:
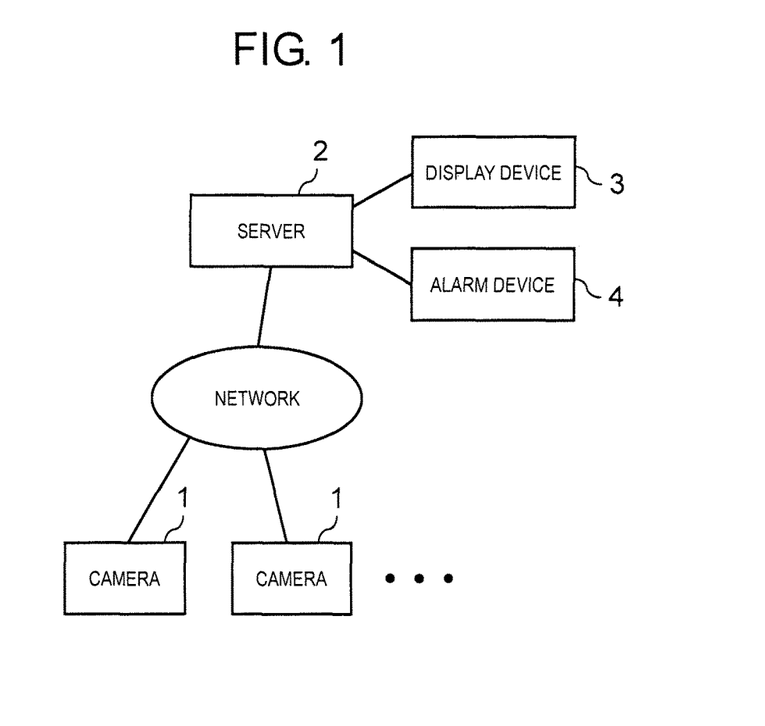
FIG. 1 is a diagram showing an overall configuration of a person's behavior monitoring system according to this embodiment.

FIG. 1 is a diagram showing an overall configuration of a person's behavior monitoring system according to this embodiment.

This person's behavior monitoring system monitors the behavior of a person staying in the facility and includes camera 1, server 2 (person's behavior monitoring device), display device 3, and alarm device 4.

A plurality of cameras 1 are installed in the facility to capture a plurality of monitoring areas set in the facility, respectively. Camera 1 is communicably connected to server 2 through a network.

Server 2 is installed at a suitable place in the facility or outside the facility. Server 2 includes an information processing device such as a PC and is connected to display device 3. In server 2, a captured image from camera 1 is acquired, information on a state of a person in the monitoring area by analyzing the captured image is acquired, a monitoring image including the information is generated, and the monitoring image is displayed on the display device 3 so that the surveillant monitors it. In the present embodiment, a wandering person (person requiring special attention) is detected by analyzing the captured image, and a monitoring image in which a fixed form image indicating the wandering person is superimposed on the captured image is generated and displayed on display device 3.

Alarm device 4 is connected to server 2 and performs an alarm operation such as turning on a lamp or outputting a sound in response to an instruction from server 2. In the present embodiment, when a wandering person is detected, alarm device 4 is caused to perform an alarm operation to notify the surveillant of the presence of a wandering person.

Figure 2:
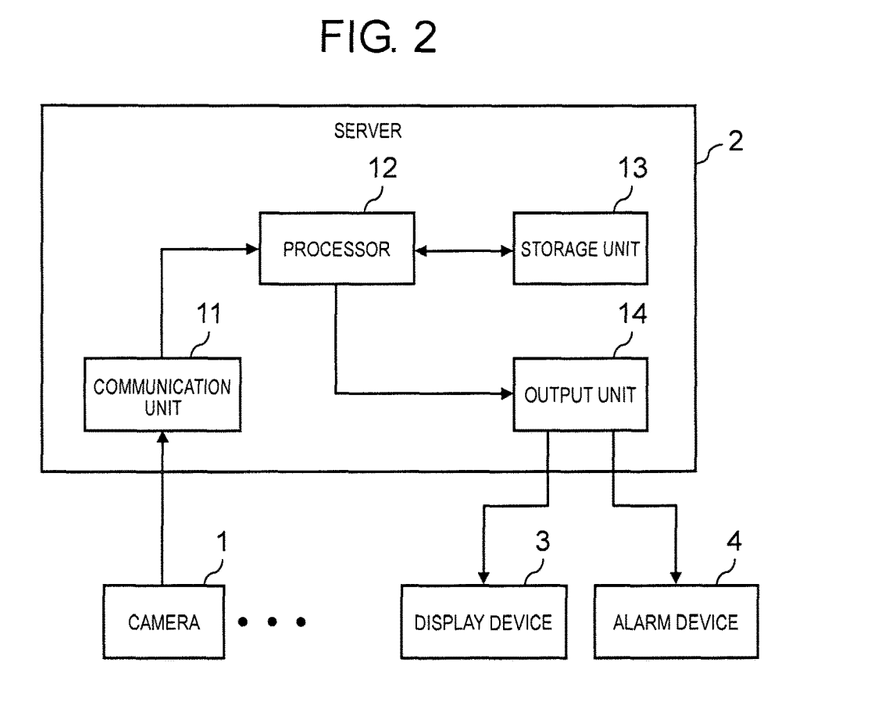
FIG. 2 is a block diagram showing a schematic configuration of server 2.

Next, a schematic configuration of server 2 will be described. FIG. 2 is a block diagram showing a schematic configuration of server 2.

Server 2 includes communication unit 11, processor 12, storage unit 13, and output unit 14.

Communication unit 11 communicates with camera 1 through a network. In the present embodiment, a captured image transmitted from camera 1 is received. Storage unit 13 stores captured images of camera 1, programs executed by processor 12, and the like. Under the control of processor 12, output unit 14 outputs screen information to display device 3 and outputs an alarm operation instruction to alarm device 4.

Processor 12 executes a program stored in storage unit 13. In the present embodiment, a person is tracked with the captured image of camera 1, and it is determined whether or not the person is a long-time stayer who stays continuously for a predetermined period of time or longer in the capturing area of one of cameras 1, a wandering person (person requiring special attention who has a high degree of need of attention) is detected based on the result of this long-time stay determination. A monitoring image in which a fixed form image indicating the wandering person is superimposed on the captured image is generated and displayed on display device 3, and alarm device 4 is caused to perform an alarm operation to notify the surveillant of the presence of a wandering person.

Figure 3A:
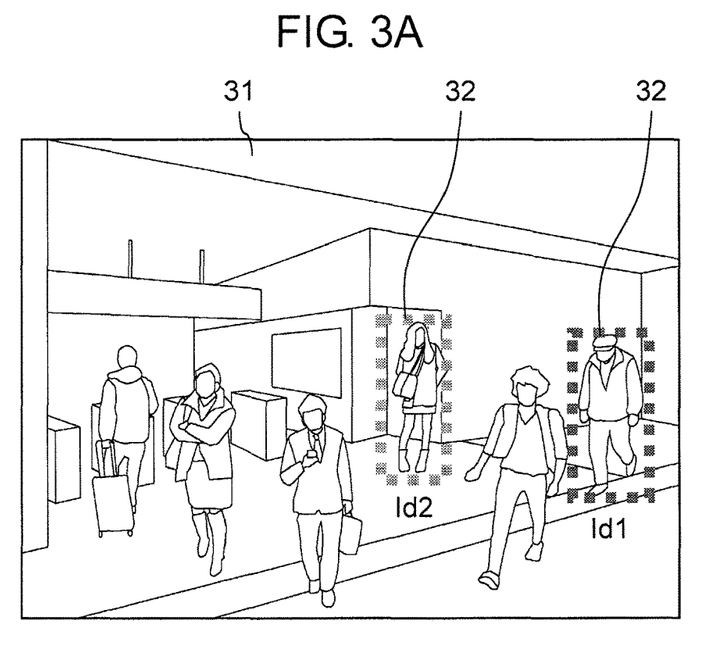
FIG. 3A is an explanatory view showing a monitoring image displayed on display device 3.
Figure 3B:
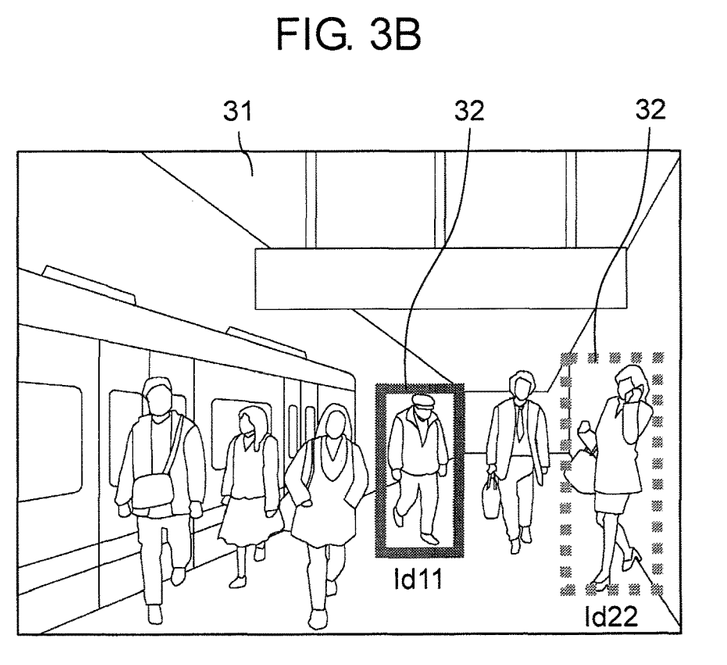
FIG. 3B is an explanatory view showing a monitoring image displayed on display device 3.

Next, the monitoring image displayed on display device 3 will be described. FIGS. 3A and 3B are explanatory views showing a monitoring image displayed on display device 3.

In a premises of a station, there are persons who are staying for a relatively long-time, such as those waiting for an arrival of a train, persons who are taking a break, and persons who are meeting with another person. Such a person does not wander much and continues to stay within the capturing area of one of cameras 1. On the other hand, a person who causes dangerous behavior tends to stay in the capturing area of one of cameras 1 and walks over a capturing area of a plurality of cameras 1 while moving around a relatively wide range.

Therefore, in the present embodiment, a person is tracked with the captured image 31 of camera 1, and the long-time stay determination is performed as to whether or not the person is a long-time stayer who stays continuously for a long-time in the capturing area of one of cameras 1, when the same person is determined to be the long-time stayer for a plurality of times, the person is detected as a wandering person (person requiring special attention who has a high degree of need of attention), and a monitoring image in which person rectangle 32 (fixed form image, a frame image) representing the wandering person is superimposed on the position corresponding to the person in captured image 31 is generated, and displayed on display device 3.

In addition, when a person who has a possibility of being determined as a wandering person is noticed to the surveillant until confirmed as a wandering person, it will be possible to respond immediately at the time of confirming as a wandering person. Therefore, in the present embodiment, when a person is determined to be a long-time stayer for the first time, that is, once the person is determined to be the long-time stayer, the person is determined to be the wandering candidate person (person requiring special attention who has a low degree of need of attention), a monitoring image in which person rectangle 32 (fixed form image) representing the wandering candidate person is superimposed on the position corresponding to the person in captured image 31 is generated and displayed on display device 3.

Further, in the present embodiment, with the difference in the display mode of person rectangle 32, the wandering candidate person and candid wandering person are identified. In the example shown in FIGS. 3A and 3B, it is possible to identify by a difference in line type of the frame line of person rectangle 32. That is, with respect to the wandering candidate person, person rectangle 32 is displayed by a dotted line, and with respect to the wandering person, rectangle 32 is displayed in a solid line. In the example shown in FIGS. 3A and 3B, a person ID assigned to each person is displayed in the vicinity of person rectangle 32.

When there is a plurality of persons who are displayed by person rectangle 32, that is, a wandering candidate person or a wandering person in one captured image 31, person rectangle 32 is displayed with a different color (for example, red, orange, blue, green, and the like) for each person.

Here, FIG. 3A shows a monitoring image of first camera 1 CamA that captures the ticket gate. In this monitoring image, since two persons Id1 and Id2 have longer staying period of time, they are determined to be a long-time stayer and person rectangle 32 is displayed, but since both persons are the wandering candidate persons, person rectangle 32 of the dotted line representing a wandering candidate person is displayed.

FIG. 3B shows a monitoring image of second camera 1 CamB that captures a home, and is captured after monitoring image of FIG. 3A is captured. In this monitoring image, since two persons Id11 and Id22 have a longer staying period of time, they are determined to be a long-time stayer and person rectangle 32 is displayed, but since one person Id11 is the same person as the person who is determined to be a long-time stayer at the timing of the monitoring image of FIG. 3A, the person is a wandering person and person rectangle 32 of the solid line representing the wandering person is displayed. In addition, since another person Id22 is not determined to be a long-time stayer in the past, the person is a wandering candidate person, and person rectangle 32 of the dotted line representing a wandering candidate person is displayed.

It should be noted that, in the present embodiment, as a fixed form image representing the difference (degree of stay of a person) between the wandering candidate person and the wandering person, person rectangle 32 (frame image) surrounding the whole body of the person is displayed, and the wandering candidate person and the wandering person are identified by the line type (dotted line and solid line) of the frame line, but a display attribute for identifying between the wandering candidate person and the wandering person is not limited to the line type of the frame line.

For example, the wandering candidate person and the wandering person may be identified by a color of the frame line. For example, the wandering candidate person may be displayed by a green frame line, and the wandering person may be displayed by a red frame line. In addition, the wandering candidate person and the wandering person may be identified by shading of the frame line. For example, the wandering candidate person may be displayed by a thin frame line, and the wandering person may be displayed by a dark frame line. In addition, the wandering candidate person and the wandering person may be identified by the thickness of the frame line. For example, the wandering candidate person may be displayed by a thin frame line, and the wandering person may be displayed by a thick frame line.

In addition, person rectangle 32 (frame image) may surround all or a part of the person region, and may surround the upper body or the face of the person, for example.

Furthermore, the fixed form image representing the difference between the wandering candidate person and the wandering person (extent of stay of a person) is not limited to the frame image surrounding the person region, and may be displayed inside or in the vicinity of the person region by at least one of a figure, a character, and a symbol.

For example, as the fixed form image, a figure or symbol having an appropriate shape such as a circle is displayed at the center of the person region, and a figure (balloon or arrow) pointing to the person region may be displayed in the vicinity of the person region so that the display mode of the figure is changed between the wandering person and the wandering candidate person. Further, characters of "wandering candidate" or "wandering" may be displayed in the vicinity of the person region. Symbols representing respectively the wandering person and the wandering candidate person may be displayed inside or in the vicinity of the person region.

Figure 4:
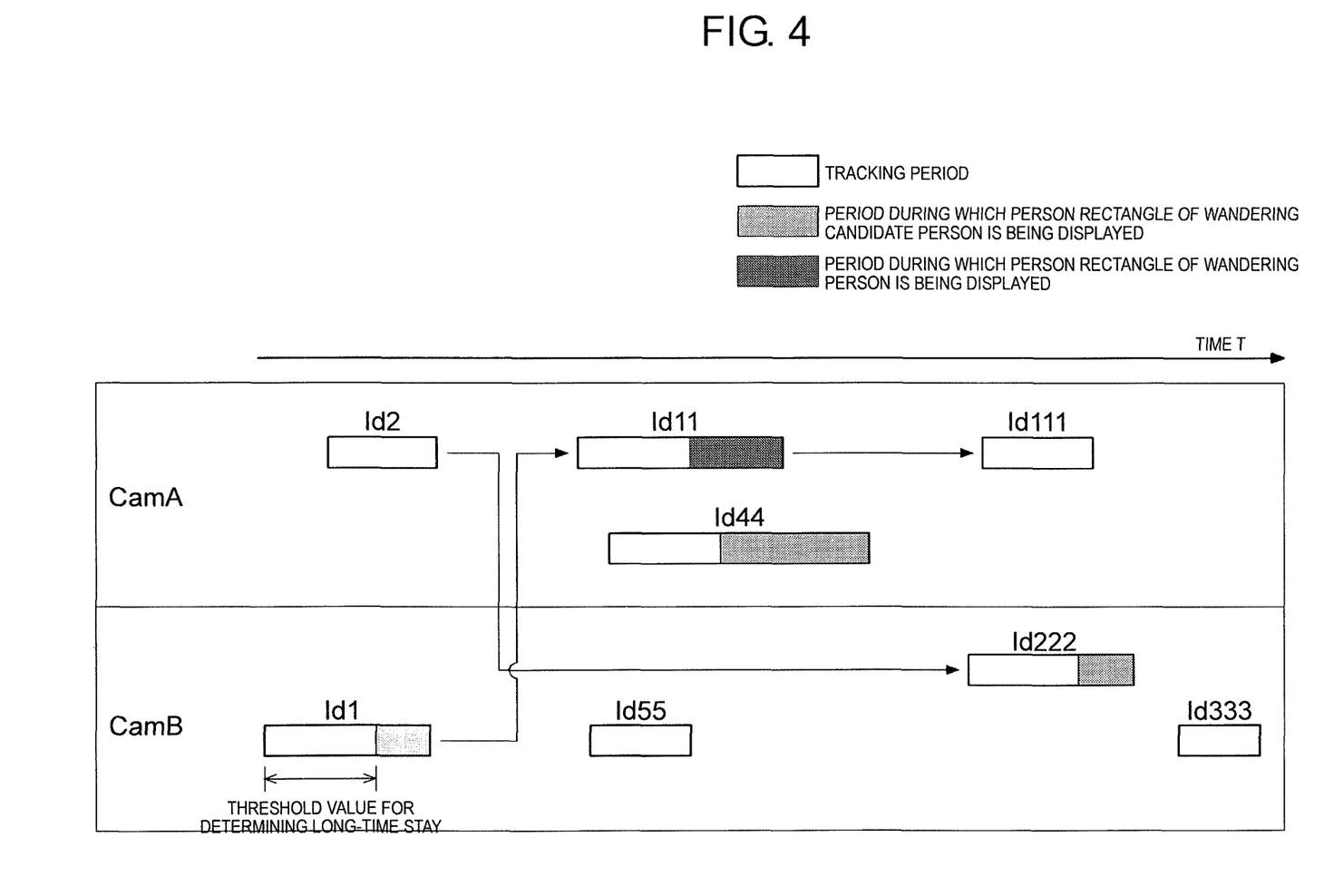
FIG. 4 is an explanatory diagram showing an example of a tracking situation of a person.

Next, long-time stay determination and wandering detection executed by processor 12 of server 2 will be described. FIG. 4 is an explanatory diagram showing an example of a tracking situation of a person.

In the present embodiment, the long-time stay determination is performed as to whether or not a person detected from the captured image of camera 1 is a long-time stayer. In this long-time stay determination, the time during which a person is tracked by the captured image of one of cameras 1, that is, elapsed time from the tracking start time to the current time is measured. When it is assumed that this measured time is a staying period of time in which a person is staying in the capturing area of one of cameras 1, this staying period of time exceeds a predetermined threshold value (for example, 20 seconds), the person is determined to be a long-time stayer and is displayed by the person rectangle of the wandering candidate person.

In the present embodiment, when the person is determined to be a long-time stayer in the long-time stay determination, person verification (person re-identification processing) is performed between a person who is determined to be a long-time stayer in the past and a person who is determined to be a long-time stayer this time and when there is a person determined to be the same person, the person is determined to be a wandering person and is displayed by the person rectangle of the wandering person.

First, in the example shown in FIG. 4, person Id1 appears in the captured image of second camera 1 CamB, and since the staying period of time is long, the person is determined to be a long-time stayer and is displayed by the person rectangle of the wandering candidate person. Next, person Id2 appears in the captured image of first camera 1 CamA, and since this staying period of time is short, the person is not determined to be a long-time stayer, so the person rectangle is not displayed.

Next, person Id11 appears in the captured image of first camera 1 CamA, and since the staying period of time is long, the person is determined to be a long-time stayer. At this time, since there is person Id1 that is determined to be a long-time stayer in the past, the person verification is performed with the person. When it is determined as the same person by the person verification, a person rectangle of a wandering person is displayed.

In addition, person Id44 appears in the captured image of first camera 1 CamA, and since the staying period of time is long, the person is determined to be a long-time stayer. At this time, the person verification is performed with the person Id1 who is determined to be a long-time stayer in the past, but since the person is not the same person and is displayed by a person rectangle of the wandering candidate person.

In addition, person Id222 appears in the captured image of second camera 1 CamB, and since the staying period of time is long, the person is determined to be a long-time stayer. At this time, since there are three persons Id1, Id11, and Id44 determined as a long-time stayer in the past, the person verification is performed with these persons, but since they are not the same person, a person rectangle of the candidate person is displayed.

In the present embodiment, the person verification is performed with the person who is determined to be a long-time stayer in the past at the timing when the person is determined to be a long-time stayer, but the person verification may be performed with the person who is determined to be a long-time stayer in the past at the timing when a person is detected from the captured image. In this way, when a person determined as a wandering candidate person or a wandering person in the past is detected from the captured image, immediately the person may be displayed by a person rectangle in accordance with the wandering candidate person or the wandering person, respectively.

In this way, when the person who is determined as a wandering candidate person in the past has a longer staying period of time in the capturing area of camera 1 and is determined as a long-time stayer, the person is changed from the wandering candidate person to the wandering person, and is displayed by the person rectangle which is switched from the person rectangle of the wandering candidate person to the person rectangle of the wandering person.

Figure 5A:
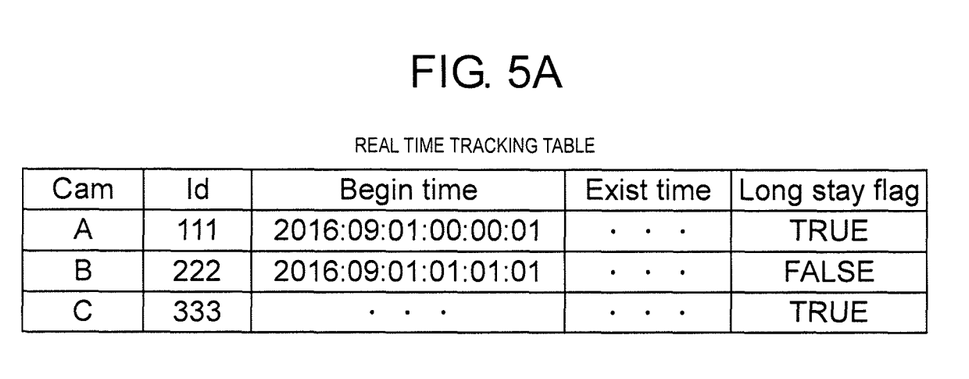
FIG. 5A is an explanatory diagram showing contents registered in a real time tracking table managed by server 2.
Figure 5B:
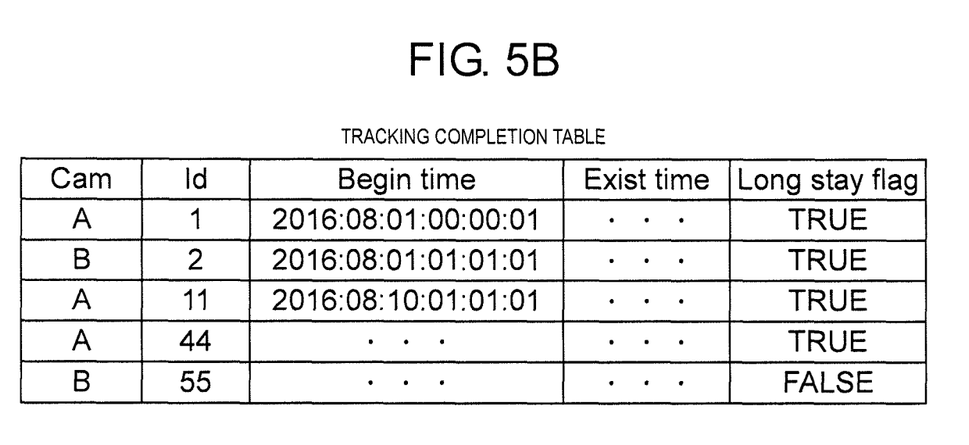
FIG. 5B is an explanatory diagram showing contents registered in a tracking completion table managed by server 2.

Next, a real time tracking table and a tracking completion table managed by server 2 will be described. FIGS. 5A and 5B are explanatory diagrams showing contents registered in the real time tracking table and the tracking completion table, respectively.

The real time tracking table (real time tracking information) shown in FIG. 5A is for registering information on the person being tracked, and information on each item of the camera ID Cam, the person ID Id, a tracking start time (Begin Time), a latest staying time (Exist Time), and a long-time stay flag (Long Stay Flag) are registered in the real time tracking table.

In the present embodiment, in processor 12 of server 2, each process of person detection and person tracking is performed for each frame (captured image) sequentially transmitted from camera 1, and the camera ID Cam, the information on each item of the person ID Id, the tracking start time (Begin Time), the latest staying time (Exist Time) which are acquired by this process, is registered in the real time tracking table.

Here, the camera ID Cam is identification information assigned to each camera 1. The person ID Id is identification information assigned to each person detected from the captured image. Tracking start time (Begin Time) is the time at which the person first appeared in the captured image and the tracking is started, that is, the capturing time of the frame where the person is first detected. The latest staying time (Exist Time) is the current time being tracked, that is, the capturing time of the current frame in which the person is detected. The long-time stay flag (Long Stay Flag) indicates whether or not it is a long-time stayer (True/False).

Further, processor 12 of server 2 calculates the difference between the tracking start time (Begin Time) and the latest staying time (Exist Time) of the real time tracking table as the staying period of time so that the long-time stay determination is performed to determine whether or not the detected person is a long-time stayer, and this determination result is registered in the real time tracking table as a long-time stay flag (Long Stay Flag). That is, with respect to a person who is determined to be a long-time stayer, the long-time stay flag (Long Stay Flag) is rewritten from "False" to "True".

The tracking completion table (confirmed tracking information) shown in FIG. 5B is for registering information on the person who is completed the tracking, and the information on each item of the camera ID Cam, the person ID Id, the tracking start time (Begin Time), the tracking end time (Exist Time), and the long-time stay flag (Long Stay Flag) are registered in the tracking completion table.

Here, the item that is the latest staying time (Exist Time) in the real time tracking table shown in FIG. 5A is determined to be the tracking end time, that is, the last time detected in the captured image when the target person leaves the capturing area of camera 1 and the tracking is ended. Others are the same as the real time tracking table.

Figure 6:
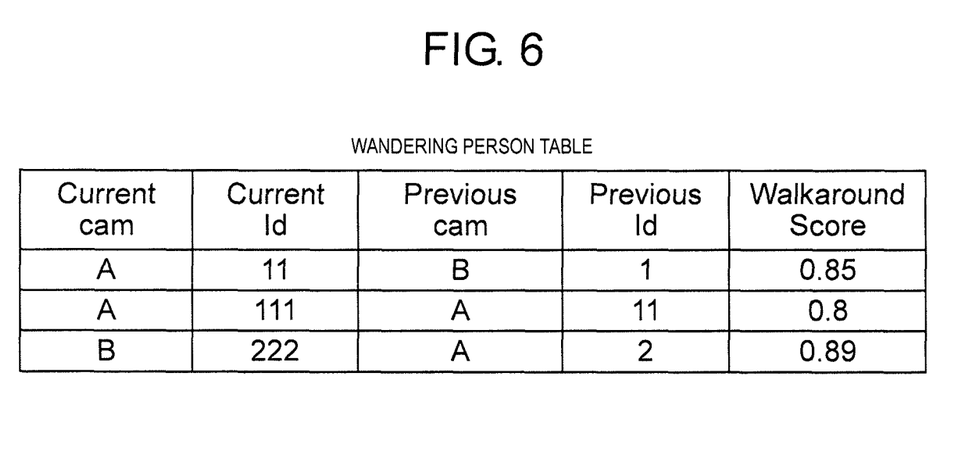
FIG. 6 is an explanatory diagram showing contents registered in a wandering person table managed by server 2.

Next, a wandering person table managed by server 2 will be described. FIG. 6 is an explanatory diagram showing contents registered in the wandering person table.

The wandering person table (wandering person information) is for registering the information on the person who is determined to be a wandering person, and information of each item of camera ID currently tracking (Current Cam), person ID currently being tracked (Current Id), camera ID (Previous Cam) when previous tracking, and person ID (Previous Id) and a degree of wandering person (Walk Around Score) are registered in this wandering person table.

In the present embodiment, in processor 12 of server 2, at the timing when the long-time stay flag (Long Stay Flag) is "True" in the real time tracking table (see FIG. 5A), wandering detection is performed to determine whether or not the person, that is, a long-time stayer is a wandering person.

In this wandering detection, the person verification (person re-identifying processing) is performed as to whether or not they are the same person between a person whose long-time stay flag (Long Stay Flag) is "True" in the tracking completion table (see FIG. 5B), that is, a person who is determined to be a long-time stayer in the past and a person whose long-time stay flag (Long Stay Flag) is "True" in the real time tracking table (see FIG. 5A), that is, a person who is determined as a long-time stayer this time.

In this person verification, the degree of similarity between two persons is calculated as a degree of wandering person (Walk Around Score), and when the degree of wandering personal exceeds a predetermined threshold value (for example 0.80), it is determined as the same person. When there is a person identified as the same person, the person is determined to be a wandering person, and information on the person is registered in the wandering person table.

Figure 7:
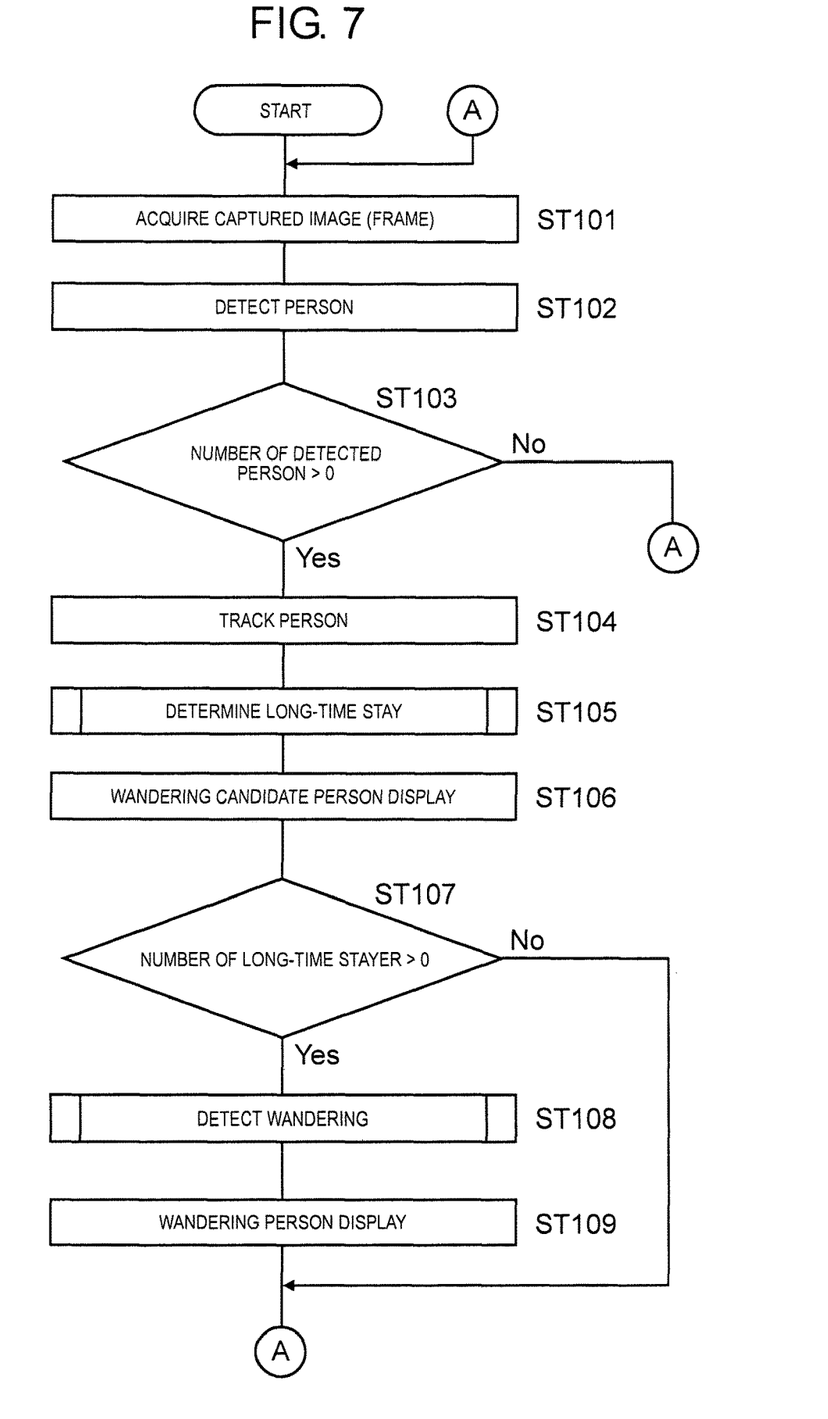
FIG. 7 is a flowchart showing a procedure of processing executed by processor 12 of server 2.
Figure 8:
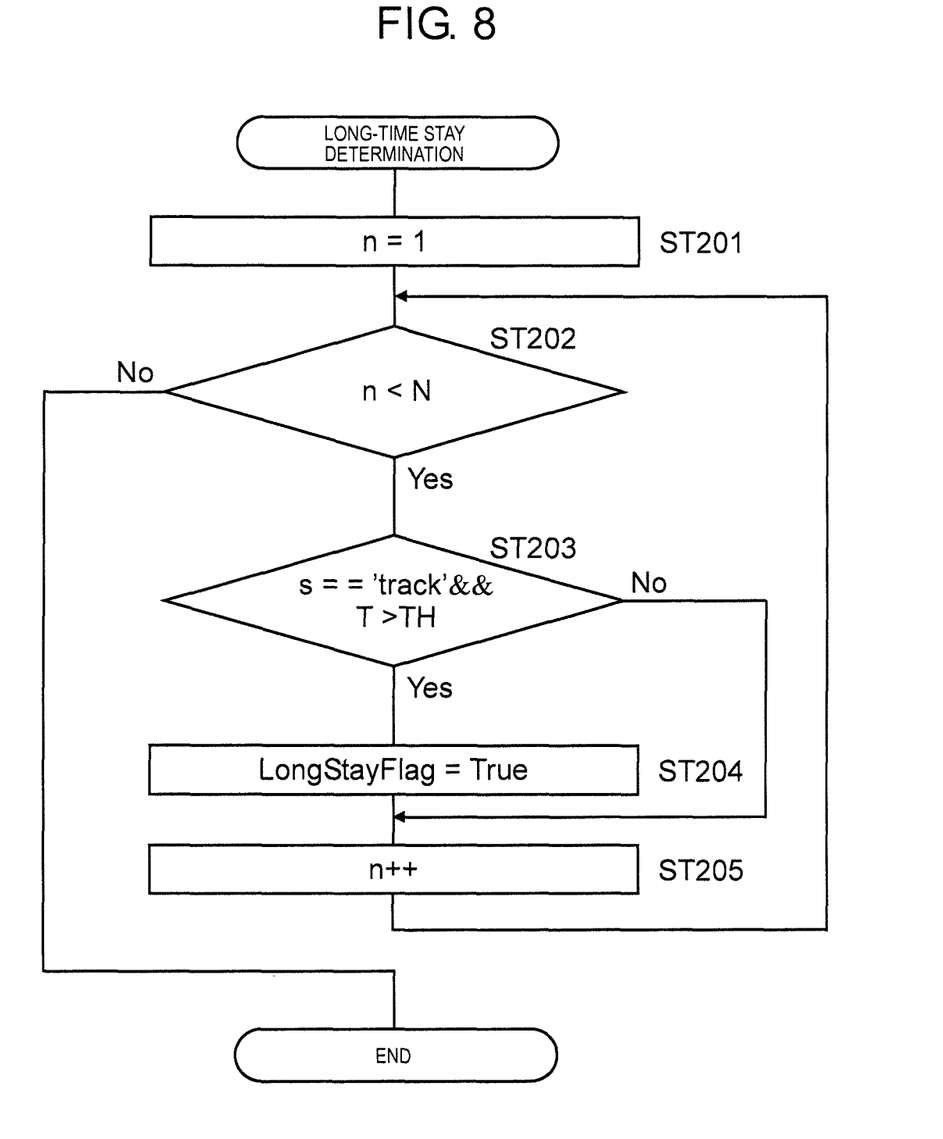
FIG. 8 is a flowchart showing a procedure of processing of long-time stay determination (ST 105).
Figure 9:
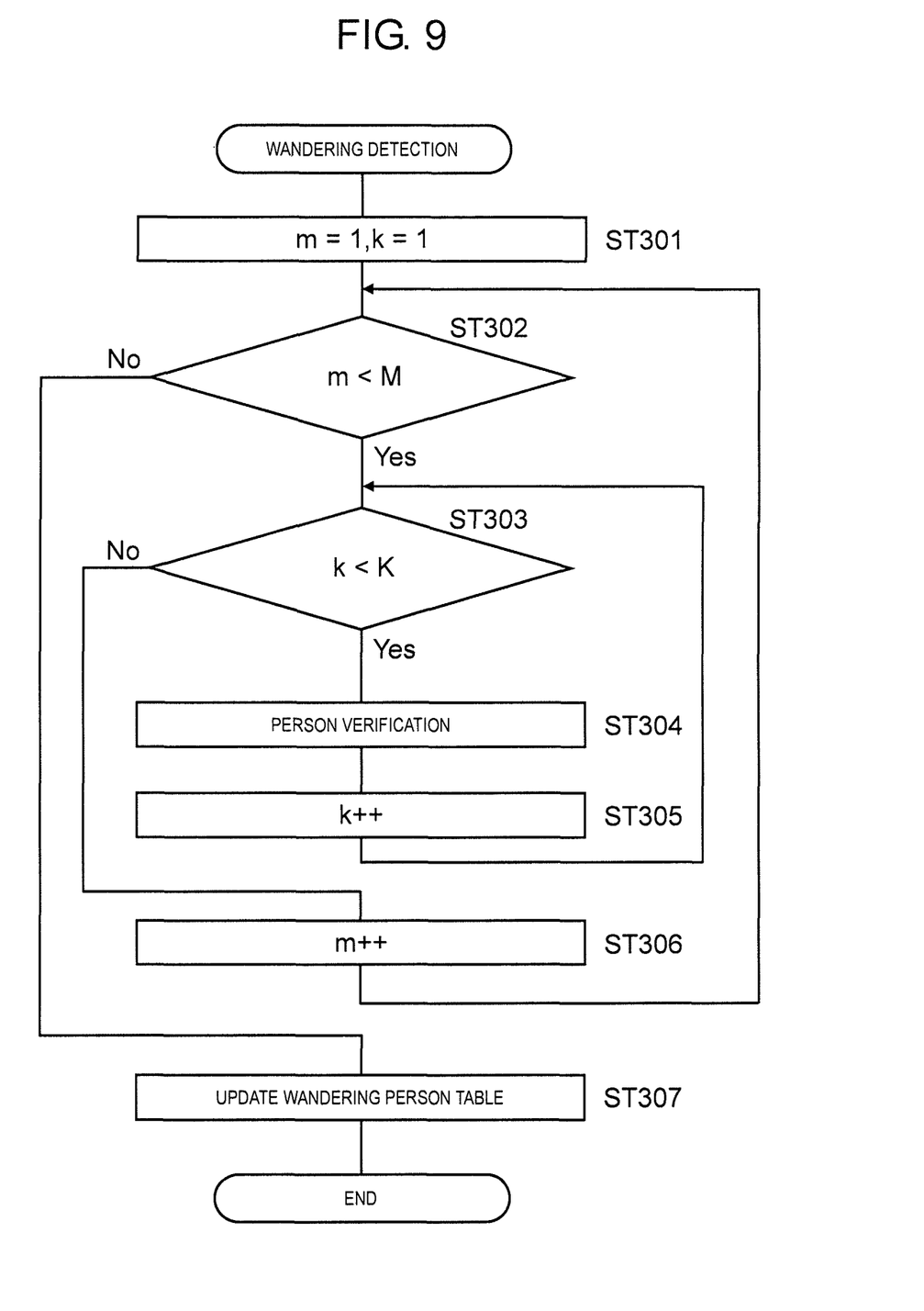
FIG. 9 is a flowchart showing a procedure of processing of wandering detection (ST 108).

Next, a procedure of processing executed by processor 12 of server 2 will be described. FIG. 7 is a flowchart showing a procedure of processing executed by processor 12 of server 2. FIG. 8 is a flowchart showing a procedure of processing of the long-time stay determination (ST 105). FIG. 9 is a flowchart showing a procedure of processing of wandering detection (ST 108).

First, processor 12 of server 2 acquires a captured image (frame) transmitted from camera 1 and received by communication unit 11, and assigns a camera ID and a frame number (ST 101). The person detection is performed on the captured image (ST 102). In camera 1, the captured image (frame) with a captured time is transmitted.

In this person detection, a person region in the captured image is specified, a person rectangle is set on the captured image to surround the person region, and information on the position and size of the person rectangle, that is, the coordinates (x, y), the width (w) and the height (h) of the upper left vertex of the person rectangle are acquired. For this person detection, a known image recognition technique may be used. A person ID is assigned to the person rectangle.

Next, it is determined whether or not a person is detected from the captured image (ST 103). Here, when no person is detected, the process proceeds to the processing of the next captured image (frame). On the other hand, when a person is detected, then a person tracking is performed (ST 104).

In this person tracking, a process of associating the person detected in the captured image (frame) this time with the person detected in the captured image (frame) in the past is performed. For this person tracking, a known image recognition technique may be used.

At this time, three tracking states of new tracking (new), tracking completion (complete) and being tracking (track) are determined. When the new tracking (new), information of the corresponding person is registered in the real time tracking table (see FIG. 5A), and when the tracking completion (complete), information of the corresponding person is registered in the tracking completion table (see FIG. 5B), and when the being tracking (track), the latest staying time (Exist Time) of the real time tracking table is updated.

Next, the long-time stay determination is performed (ST 105). In the long-time stay determination, it is determined whether or not the person being tracked with the captured image is a long-time stayer who stays continuously for a predetermined period of time or longer in the capturing area of camera 1 capturing the captured image.

The procedure of processing of this long-time stay determination processing is shown in FIG. 8 in detail. Here, when the tracking state (s) is the being tracking (track) and the staying period of time T exceeds the threshold value TH (for example, 20 seconds) (Yes in ST 203), the person is determined to be a long-time stayer, and the long stay flag (Long Stay Flag) of the corresponding person in the real time tracking table (see FIG. 5A) is set to "True" (ST 204). Here, n is serial number of the person rectangle and N is total number of the person rectangles, and each person detected by the person detection this time is sequentially determined.

The staying period of time T is the elapsed time from the tracking start time to the current time and is calculated as the difference between the tracking start time (Begin Time) and the latest staying time (Exist Time) of the real time tracking table (see FIG. 5A). Further, a person whose tracking state(s) is the new tracking (new) and the tracking completion (complete) is excluded from the target of the long-time stay determination.

When the long-time stay determination is performed (ST 105) in this way, as shown in FIG. 7, a wandering candidate person is displayed (ST 106). Here, a person who is determined to be a long-time stayer, that is, a person whose long-time stay flag (Long Stay Flag) of the real time tracking table (see FIG. 5A) is "True" is displayed as the wandering candidate person. That is, a person rectangle (dotted line) of the wandering candidate person is displayed on the corresponding person in the captured image (see FIGS. 3A and 3B).

Next, it is determined whether or not there is a person who is determined as a long-time stayer in the past (ST 107), that is, a person whose long-time stay flag (Long Stay Flag) is "True" in the tracking completion table (see FIG. 5B). Here, when there is no person determined as a long-time stayer in the past (No in ST 107), the process proceeds to the processing of the next captured image (frame). On the other hand, when there is a person who is determined to be a long-time stayer in the past (Yes in ST 107), the wandering detection is performed (ST 108).

In this wandering detection (ST 108), the person verification (person re-identification processing) is performed between a person who is determined to be a long-time stayer in the past and a person who is determined to be a long-time stayer this time, and when there is a person who is determined to be a wandering person, the person is determined to be the same person and a wandering person table (see FIG. 6) is updated.

The procedure of processing of wandering detection is shown in detail in FIG. 9. Here, k and K are respectively a serial number or a total number of the persons who are determined to be a long-time stayer in the past, that is, the person whose the long-time stay flag (Long Stay Flag) is "True" in the tracking completion table (see FIG. 5B), and m and M are respectively the serial number or the total number of the persons who are determined to be a long-time stayer this time, that is, the persons whose long-stay flag ("Long Stay Flag") is "True" in the real time tracking table (see FIG. 5A), a one-to-one person verification is sequentially performed between the person who is determined to be a long-time stayer in the past and the person who is determined to be the long-time stayer this time.

In the present embodiment, the person verification is performed with respect to a person who is determined to be a long-time stayer within a predetermined verification target period retrospectively from the present to the past. The length of the verification target period may be set to about several tens of minutes, for example. Further, it is preferable that the user may appropriately set the length of the verification target period.

In addition, it is preferable that a known method is used for the person verification. Specifically, with respect to two persons to be verified, the person image obtained by cutting out the region of the person rectangle from the captured image is acquired, and the feature amount of the color is extracted from the two person images. For example, a vector of a feature amount is acquired by generating a histogram of the HSV color space from each person image and the like. Next, by comparing the feature amount of the color, the degree of similarity between the two person images is calculated. When the combination having the highest degree of similarity is selected and the degree of similarity is higher than the predetermined threshold value, the persons of the two person images are determined to be the same person.

It should be noted that the person who is determined to be the long-time stayer in the past and the person who is determined to be the long-time stayer this time do not always appear in the captured image of another camera 1 from each other. That is, when all the places of the facility are not captured by camera 1, after a person disappears from the captured image of camera 1, may appear in the captured image of the same camera 1 without appearing in the captured image of another camera 1, in this case, it is determined as a long-time stayer continuously with a captured image of the same camera 1.

When the wandering detection is performed in this way (ST 108), then, as shown in FIG. 7, a wandering person display is performed (ST 109). Here, a person rectangle for a wandering person is displayed on a person detected as a wandering person by wandering detection on the captured image. At this time, in the wandering person, the long-time stay flag (Long Stay Flag) is "True" in the real time tracking table (see FIG. 5A) and the combination of the camera ID and the person ID that is the same as that of the real time tracking table is registered in the wandering person table (see FIG. 6). In addition, as long as the long-time stay flag (Long Stay Flag) is "True" in the real time tracking table, that is, while a person is being detected, the person rectangle for the wandering person is continuously displayed.

As described above, the embodiment has been described as an example of the technique disclosed in the present application. However, the technology in the present disclosure is not limited to this, and may also be applied to embodiments in which change, replacement, addition, deletion, and the like are performed. In addition, it is also possible to combine each component described in the embodiment described above to form a new embodiment.

For example, in the embodiment described above, a railway station is described as an example, but it is not limited to such a railway station, and it may be widely applied to various facilities.

In addition, in the embodiment described above, the monitoring screen is displayed on the display device connected to the server to be monitored by the surveillant, and the server and the display device are installed in the monitoring room, so that the monitoring screen of the display device may be monitored by the surveillant, but when the mobile device such as a smart phone or a tablet terminal is configured to be connectable to a server through a wireless communication network such as a wireless LAN, it is possible to monitor the monitoring screen at any place in the facility. In addition, when a user terminal such as a portable device or a PC is configured to be connectable to a server through a wide area communication network such as the Internet, it is possible to monitor the monitoring screen at any place outside the facility.

In the embodiment described above, when a determination result that the same person is a long-time stayer is obtained once, the fixed form image (person rectangle) of the wandering candidate person is displayed, and when a determination result that the same person is a long-time stayer is obtained twice, the fixed form image (person rectangle) of the wandering person is displayed, but, when a determination result that the same person is a long-time stayer is obtained three or more times, the display mode of the fixed form image may be further changed according to the number of times of determination.

Further, after displaying the fixed form image (person rectangle) of the wandering candidate person, the fixed form image (person rectangle) of the wandering person may not be immediately displayed by the determination result of the next long-time stayer, and when the determination result of the long-time stayer is continuous (twice or more), the fixed form image of the wandering person may be displayed.

INDUSTRIAL APPLICABILITY

A person's behavior monitoring device and the person's behavior monitoring system according to the present disclosure have an effect that it is possible to efficiently perform a monitoring work for monitoring a person staying in the facility in real time by appropriately paying attention to a person requiring special attention, by the surveillant even in an environment where many persons come and go, and are useful as a person's behavior monitoring device and the person's behavior monitoring system that generate a monitoring image from captured images of a plurality of cameras installed in a facility and display the monitoring image on a display device and the like.

REFERENCE MARKS IN THE DRAWINGS

1 CAMERA
2 SERVER (PERSON'S BEHAVIOR MONITORING DEVICE, SERVER DEVICE)
3 DISPLAY DEVICE

4 ALARM DEVICE
11 COMMUNICATION UNIT
12 PROCESSORS
13 STORAGE
14 OUTPUT UNIT

The invention claimed is:

1. A person's behavior monitoring device that generates a monitoring image from captured images of a plurality of cameras installed in a facility and displays the monitoring image on a display device, comprising:
 a processor for acquiring the captured image of each of the plurality of cameras, acquiring information relating to a person requiring special attention by analyzing the captured image, and generating the monitoring image including the information,
 wherein the processor
 determines, for each of the plurality of cameras, whether or not a person detected from the captured image is a long-time stayer who stays continuously for a predetermined period of time or longer in a capturing area of one of the plurality of cameras based on a result of tracking the person,
 generates the monitoring image in which a fixed form image that enables identification of a degree of stay is superimposed on the captured image in correspondence with the person corresponding to the long-time stayer,
 determines whether or not the person who is determined as the long-time stayer is same as a past long-time stayer who has been determined as the long-time stayer in the past and detected to have left the capturing area of the one of the plurality of cameras in the past, and
 in response to determining that the person who is determined as the long-time stayer is the same as the past long-time stayer, changes a display mode of the fixed form image.

2. The person's behavior monitoring device of claim 1, wherein the processor
 changes a display mode of the fixed form image in response to determining that the person who is determined as the long-time stayer is same as the past long-time stayer for a plurality of times.

3. The person's behavior monitoring device of claim 1, wherein the processor further
 determine whether or not the person who is determined as the long-time stayer based on the captured image by a first camera, is same as the past long-time stayer who has been determined as the long-time stayer in the past based on the captured image by a second camera different from the first camera and detected to have left the capturing area of the second camera in the past, and
 changes the display mode of the fixed form image, in response to determining that the the person who is determined as the long-time stayer based on the captured image by the first camera is same as the past long-time stayer based on the captured image by the second camera.

4. The person's behavior monitoring device of claim 3, further comprising
 a storage that stores a tracking completion list that includes at least one past long-time stayer, each being associated with a capturing camera of the plurality of cameras, wherein each of the at least one past long-time stayer has been determined as the long-time stayer in the past based on the captured image of the capturing camera of the plurality of camera and detected to have left the capturing area of the capturing camera of the plurality of cameras in the past,
 wherein the processor determines whether or not the tracking completion list includes a past long-time stayer associated with the second camera that matches the person who is determined as the long-time stayer based on the captured image, to determine whether or not the person who is determined as the long-time stayer based on the captured image by the first camera is same as the past long-time stayer based on the captured image by the second camera, and
 the processor changes the display mode of the fixed form image, in response to determining that the tracking completion list includes the past long-time stayer associated with the second camera that matches the person who is determined as the long-time stayer based on the captured image by the first camera.

5. The person's behavior monitoring device of claim 4, wherein the processor further
 detects that the person who is determined as the long-time stayer has left the capturing area of the first camera based on the result of tracking the person in the capturing area of the first camera; and
 stores, in the tracking completion list, the person who is determined as the long-time stayer, as the past long-time stayer, in association with the first camera, in response to detecting that the person has left the capturing area of the first camera.

6. The person's behavior monitoring device of claim 1, wherein the fixed form image is a frame image surrounding at least a part of a person region in the captured image and at least one of display attribute of color, shading, line type, and line thickness in the frame image is changed in accordance with the degree of stay.

7. The person's behavior monitoring device of claim 1, wherein the fixed form image includes at least one of a figure, a character, and a symbol displayed inside or in a vicinity of a person region in the captured image.

8. The person's behavior monitoring device of claim 1, wherein the processor causes an alarm device to perform an alarm operation to notify a surveillant that there is the person requiring special attention, in response to determining that the person who is determined as the long-time stayer is same as the past long-time stayer.

9. The person's behavior monitoring device of claim 1, further comprising
 a storage that stores a tracking completion list that includes at least one past long-time stayer who has been determined as the long-time stayer in the past and detected to have left the capturing area of the one of the plurality of cameras in the past,
 wherein the processor determines whether or not the tracking completion list includes a past long-time stayer that matches the person who is determined as the long-time stayer, to determine whether or not the person who is determined as the long-time stayer is same as the past long-time stayer, and
 the processor changes the display mode of the fixed form image, in response to determining that the tracking completion list includes the past long-time stayer that matches the person who is determined as the long-time stayer.

10. The person's behavior monitoring device of claim 9, wherein the processor further
 detects that the person who is determined as the long-time stayer has left the capturing area of the one of the plurality of cameras based on the result of tracking the person in the capturing area of the one of the plurality of cameras; and stores, in the tracking completion list, the person who is determined as the long-time stayer, as the past long-time stayer, in response to detecting that the person has left the capturing area of the one of the cameras.

11. The person's behavior monitoring device of claim 9, wherein the processor further

- extracts a color feature amount of a person image of the person who is determined as the long-time stayer from the captured image;
- acquires a degree of similarity by comparing the extracted color feature amount with a color feature amount of a person image of one of the at least one past long-time stayer included in the tracking completion list; and
- determines that the person who is determined as the long-time stayer is same as the one of the at least one past long-time stayer in the tracking completion list, when the acquired degree of similarity exceeds a predetermined threshold value.

12. A person's behavior monitoring system, comprising:

a plurality of cameras installed in a facility;

a server device that acquires captured images of the plurality of cameras through a network to generate a monitoring image; and a display device that displays the monitoring image output from the server device, wherein the server device includes a processor for acquiring the captured image of each of the plurality of cameras, acquiring information relating to a person requiring special attention by analyzing the captured image, and generating the monitoring image including the information, and wherein the processor determines, for each of the plurality of cameras, whether or not a person detected from the captured image is a long-time stayer who stays continuously for a predetermined period of time or longer in a capturing area of one of the plurality of cameras based on a result of tracking the person, generates the monitoring image in which a fixed form image that enables identification of a degree of stay is superimposed on the captured image in correspondence with the person corresponding to the long-time stayer, determines whether or not the person who is determined as the long-time stayer is same as a past long-time stayer who has been determined as the long-time stayer in the past and detected to have left the capturing area of the one of the plurality of cameras in the past, and in response to determining that the person who is determined as the long-time stayer is the same as the past long-time stayer, changes a display mode of the fixed form image.

* * * * *